United States Patent
Yilmaz et al.

(10) Patent No.: US 9,188,009 B2
(45) Date of Patent: Nov. 17, 2015

(54) BORE CAVITY THERMAL CONDITIONING SYSTEM

(71) Applicant: United Technologies Corporation, Hartford, CT (US)

(72) Inventors: Cagdas Yilmaz, Moodus, CT (US); Paul E. Coderre, East Hampton, CT (US)

(73) Assignee: United Technologies Corporation, Hartford, CT (US)

( * ) Notice: Subject to any disclaimer, the term of this patent is extended or adjusted under 35 U.S.C. 154(b) by 620 days.

(21) Appl. No.: 13/663,665

(22) Filed: Oct. 30, 2012

(65) Prior Publication Data
US 2014/0219794 A1    Aug. 7, 2014

(51) Int. Cl.
*F01D 5/08* (2006.01)
*F02C 7/12* (2006.01)

(52) U.S. Cl.
CPC ............ *F01D 5/085* (2013.01); *F01D 5/081* (2013.01); *F02C 7/12* (2013.01); *F05D 2260/213* (2013.01); *Y02T 50/676* (2013.01)

(58) Field of Classification Search
CPC .......... F02C 7/12; F01D 5/081; F01D 5/085; F05D 2260/213; Y02T 50/676
See application file for complete search history.

(56) References Cited

U.S. PATENT DOCUMENTS

| 4,137,705 | A | | 2/1979 | Andersen et al. |
| 5,279,111 | A | | 1/1994 | Bell et al. |
| 5,685,158 | A | | 11/1997 | Lenahan et al. |
| 5,906,093 | A | * | 5/1999 | Coslow et al. .................. 60/777 |
| 6,065,282 | A | * | 5/2000 | Fukue et al. .................. 415/115 |
| 6,267,553 | B1 | * | 7/2001 | Burge ............................ 415/115 |
| 6,560,966 | B1 | * | 5/2003 | Fetescu et al. ................. 60/775 |

FOREIGN PATENT DOCUMENTS

| JP | 2008232047 A | 10/2008 |
| WO | 9744575 | 11/1997 |

OTHER PUBLICATIONS

The International Search Report mailed Feb. 7, 2014 for International Application No. PCT/US2013/067436.

* cited by examiner

*Primary Examiner* — Igor Kershteyn
(74) *Attorney, Agent, or Firm* — Kinney & Lange, P.A.

(57) ABSTRACT

A gas turbine engine includes a rotor having at least one rotor bore cavity and a heat exchanger. The heat exchanger is fluidically connected to a conditioning air source and to the rotor bore cavity for flowing air from the conditioning air source to the rotor bore cavity. The heat exchanger is also fluidically connected to a hot fluid source and a cool fluid source for selectively heating and cooling conditioning air flowing to the rotor bore cavity.

20 Claims, 2 Drawing Sheets

BORE CAVITY THERMAL CONDITIONING SYSTEM

BACKGROUND

The present invention relates to gas turbine engines, and in particular, to thermal conditioning of bore cavities in gas turbine engines. Gas turbine engines typically operate with very high temperatures in compressor, combustor, and turbine sections. Different components in a gas turbine engine are subjected to different temperatures depending on component location. Additionally, a single component can be subjected to different temperatures at different parts of that component. Moreover, a component can be exposed to different temperatures during different operating conditions of the gas turbine engine.

For example, when hot gas flows through a compressor section during engine idle, disks that form a rotor in the compressor section can have a relatively hot rim and a relatively cool bore and web. When the gas turbine engine is sped up, for example, prior to take-off of an aircraft for a propulsion engine, the hot gas can increase in temperature. This can further increase the temperature of rims of the disks. While the bore and web of the disks may eventually increase in temperature as well, this can happen at a rate slower than that of the rim of the disk. Because metal disks typically expand when heated, this can result in a situation where disk rims expand more quickly than disk webs and bores, this creating undesirable stresses in the webs and bores. The opposite effect can happen during aircraft descent, where disk rims cool more quickly than disk bores and webs. This can also result in undesirable stresses in the webs and bores, which can lead to damaged disks after a number of cycles.

SUMMARY

According to the present invention, a gas turbine engine includes a rotor having at least one rotor bore cavity and a heat exchanger. The heat exchanger is fluidically connected to a conditioning air source and to the rotor bore cavity for flowing air from the conditioning air source to the rotor bore cavity. The heat exchanger is also fluidically connected to a hot fluid source and a cool fluid source for selectively heating and cooling conditioning air flowing to the rotor bore cavity.

Another embodiment is a gas turbine engine that includes a rotor including at least one rotor bore cavity and a bore cavity thermal conditioning system. The bore cavity thermal conditioning system has a plurality of passages that deliver heated conditioning air to the rotor bore cavity for a first engine operating condition that includes an increase in gas turbine engine power resulting in an increase in gas path temperature. The plurality of passages also deliver cooled conditioning air to the rotor bore cavity for a second engine operating condition that includes a decrease in gas turbine engine power resulting in a decrease in gas path temperature.

Another embodiment is a method that includes supplying conditioning air to a rotor disk bore cavity of a gas turbine engine, heating the conditioning air for a first engine operating condition, and cooling the conditioning air for a second engine operating condition. The first engine operating condition has an increase in gas turbine engine power resulting in an increase in gas path temperature. The second engine operating condition has a decrease in gas turbine engine power resulting in a decrease in gas path temperature.

DETAILED DESCRIPTION

Figure 1:
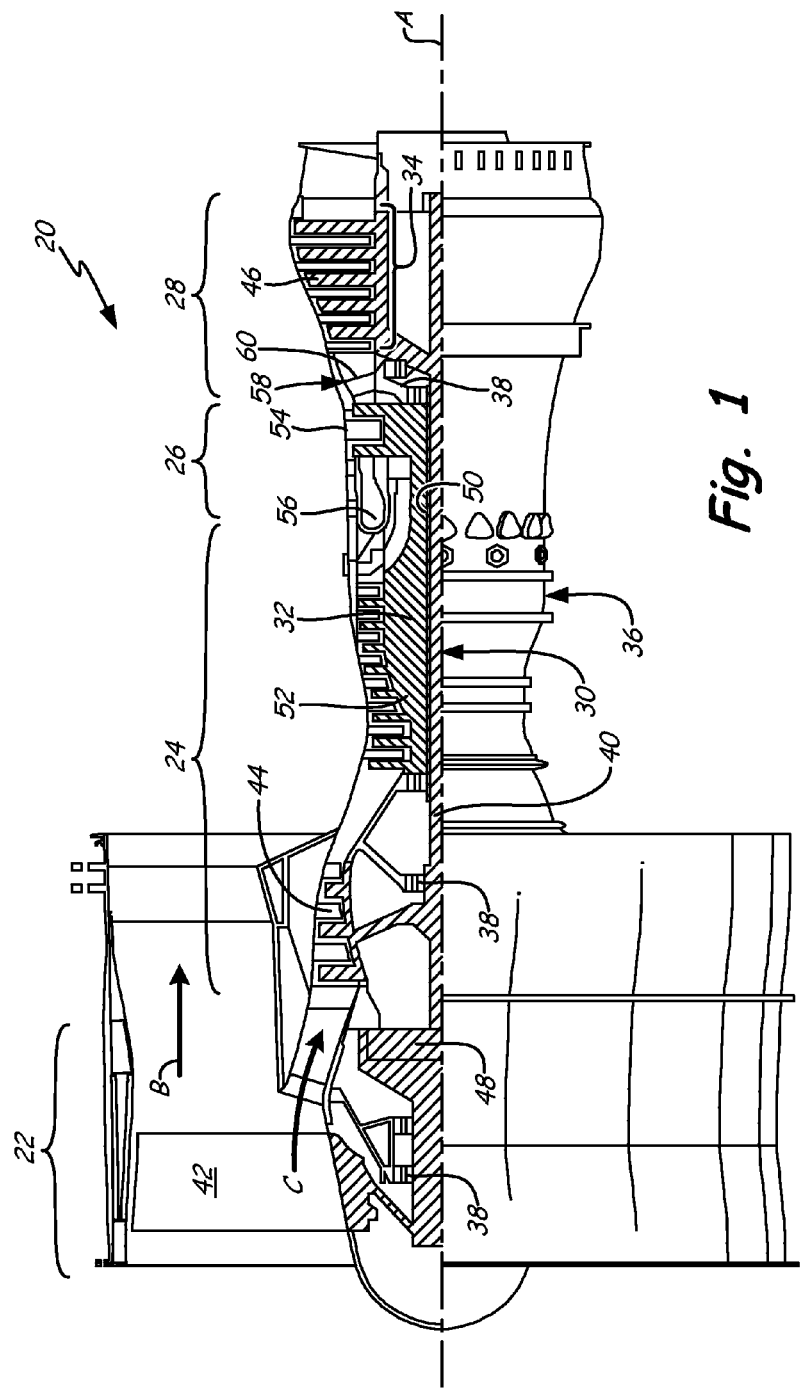
FIG. 1 is a schematic side sectional view of a gas turbine engine.

FIG. 1 schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52, mixed with fuel and ignited in combustor 56 to produce high speed exhaust gases that are then expanded through high pressure turbine 54 and low pressure turbine 46. Mid-turbine frame 58 includes vanes 60, which are in the core airflow path and function as an inlet guide vane for low pressure turbine 46. Utilizing vane 60 of mid-turbine frame 58 as the inlet guide vane for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

A significant amount of thrust is provided by bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7]^{0.5}$. The "Low corrected fan tip speed", as disclosed herein according to one non-limiting embodiment, is less than about 1150 ft/second.

The example gas turbine engine includes fan 42 that comprises in one non-limiting embodiment less than about 26 fan blades. In another non-limiting embodiment, fan section 22 includes less than about 20 fan blades. Moreover, in one disclosed embodiment low pressure turbine 46 includes no more than about 6 turbine rotors schematically indicated at 34. In another non-limiting example embodiment low pressure turbine 46 includes about 3 turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Figure 2:
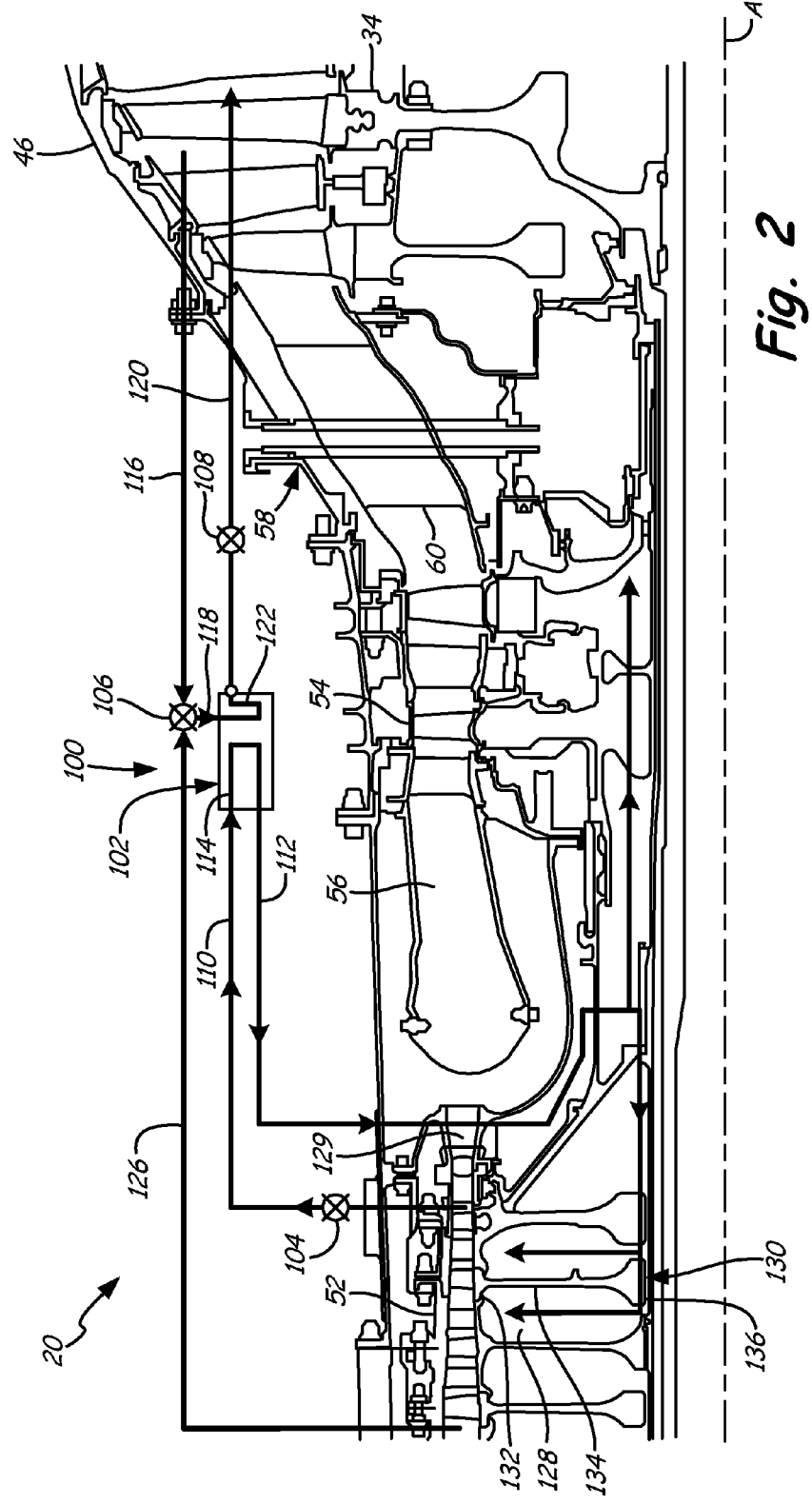
FIG. 2 is a schematic partial side sectional view of the gas turbine engine of FIG. 1 with a bore cavity thermal conditioning system.

FIG. 2 is a schematic partial side sectional view of gas turbine engine 20 with bore cavity thermal conditioning system 100. Bore cavity thermal conditioning system 100 includes heat exchanger 102, valves 104, 106, and 108, and passages 110, 112, 114, 116, 118, 120, 122, and 126.

Passage 110 is a conditioning air passage fluidically connecting high pressure compressor 52 to heat exchanger 102. Passage 112 is a conditioning air passage fluidically connecting heat exchanger 102 to rotor bore cavity 128. Passage 114 is an internal passage inside heat exchanger 102 connecting passage 110 to passage 112 to allow conditioning air to flow from high pressure compressor 52, or another conditioning air source, through heat exchanger 102 and to rotor bore cavity 128. In the illustrated embodiment, passage 110 is connected to high pressure compressor 52 at a downstream portion of high pressure compressor 52. In an alternative embodiment, passage 110 can be connected to diffuser 129, positioned downstream of high pressure compressor 52. In further alternative embodiments, passage 110 can be connected to another conditioning air source having a suitable air pressure and air quality for being supplied to bore cavity 128. Valve 104 can selectively control flow through passages 110, 112, and 114 to bore cavity 128. Bore cavity 128 is defined, in part, as space between rotor disks 130 of high pressure compressor 52. Bore cavity 128 is one of multiple bore cavities between rotor disks of low pressure compressor 44 (shown in FIG. 1), high pressure compressor 52, high pressure turbine 54, and low pressure turbine 46, that can receive conditioning air via passage 112. Bore cavity 128 can be the space between adjacent rotor disks 130 or can be the space between rotor disks 130 that are separated by one or more other rotor disks 130 (and thus define a space that contains one or more rotor disks 130).

Passage 116 is a hot fluid passage fluidically connecting low pressure turbine 46, or another hot fluid source, to heat exchanger 102. In the illustrated embodiment, passage 116 connects directly to valve 106, which is connected to heat exchanger 102 via passage 118. Passage 120 is an exhaust passage fluidically connecting heat exchanger 102 to low pressure turbine 46, or another location in gas turbine engine 20 to which air from heat exchanger 102 can be exhausted. Passage 122 is an internal passage inside heat exchanger 102 connecting passage 118 and 120 to allow hot fluid, such as hot air, to flow from low pressure turbine 46, through heat exchanger 102, and back to low pressure turbine 46. Passage 122 is fluidically isolated from passage 114 but is in heat exchange relationship with passage 114 so as to transfer heat from hot fluid flowing through passage 122 to conditioning air flowing through passage 114. In the illustrated embodiment, heat exchanger 102 is an air to air heat exchanger.

Passage 126 is a cool fluid passage fluidically connecting high pressure compressor 52, or another cool fluid source, to heat exchanger 102. In the illustrated embodiment, passage 126 is connected immediately upstream of high pressure compressor 52, which is downstream of low pressure compressor 44 (shown in FIG. 1). In an alternative embodiment, passage 126 can be connected to a different portion of either low pressure compressor 44 or high pressure compressor 52 that is upstream of passage 110. In a further alternative embodiment, passage 126 can be connected downstream of fan section 22 (shown in FIG. 1) along bypass flow path B (shown in FIG. 1) such that bypass flow path B becomes the cool fluid source. In the illustrated embodiment, passage 126 connects directly to valve 106, which is connected to heat exchanger 102 via passage 118. The combination of passages 126, 118, 120, and 122 allow cool fluid, such as cool air, to flow from high pressure compressor 52, through heat exchanger 102, and back to low pressure turbine 46. When cool fluid is flowing through passage 122, heat from conditioning air in passage 114 can transfer to the cool fluid flowing through passage 122.

Valve 106 can selectively allow and limit fluid flow to and through heat exchanger 102. In a first position, valve 106 can allow hot fluid flow from low pressure turbine 46 through valve 106 and heat exchanger 102, while limiting cool fluid flow from high pressure compressor 52. In a second position, valve 106 can allow cool fluid flow from high pressure compressor 52 through valve 106 and heat exchanger 102, while limiting hot fluid flow from low pressure turbine 46. Valve 106 can be selectively actuated to either heat or cool conditioning air flowing through passage 114 to rotor bore cavity 128. Valve 108 can selectively limit fluid flowing through passage 120, whether cool fluid or hot fluid, to be exhausted from heat exchanger 102 to low pressure turbine 46 and eventually out of gas turbine engine 20. In alternative embodiments, valve 104, valve 106, and/or valve 108 can be replaced by one or more blocker doors, sliding doors, flappers, ejectors, or other device suitable for controlling fluid flow.

As described above, different parts of rotor disks 130 can experience different temperatures during different operating conditions of gas turbine engine 20. For example, during take-off of an aircraft (not shown) associated with gas turbine engine 20, gas turbine engine 20 can increase its power output resulting in an increase in temperature of airflow through core flow path C (shown in FIG. 1). In that operating condition, rim 132 of rotor disk 130 can be heated to a temperature about 800° F. (444° C.) higher than that of web 134 and bore 136 of rotor disk 130. Bore cavity thermal conditioning system 100 can reduce that thermal gradient by heating bore cavity 128, and thus heating web 134 and bore 136, prior to take-off. For example, bore cavity 128 can be heated to within about 200° F. (111° C.) of the temperature of rim 132, heated to within about 0° F. (0° C.) of the temperature of rim 132, or heated to a temperature in excess of the temperature of rim 132. In one embodiment, bore cavity 128 can be heated during all engine idle conditions prior to take-off and during at least a portion of take-off. In an alternative embodiment, bore cavity 128 can be heated for a shorter time period so long as the time period is sufficient to reduce thermal gradient between rim 132 and web 134 and bore 136. Bore cavity 128 is heated by valve 106 being actuated to allow hot gas from low pressure turbine 46 to flow through heat exchanger 102 to heat conditioning air also flowing through heat exchanger 102. That conditioning air can then be supplied to bore cavity 128, and other bore cavities, after being heated. In some embodiments of gas turbine engine 20, one important period of time for reducing thermal gradient is about ten seconds into take-off of gas turbine engine 20 and its associated aircraft.

In other operating conditions, valve 106 can be actuated to limit hot gas flow though heat exchanger 102, and instead allow cool gas flow through heat exchanger 102 to heat the conditioning air also flowing through heat exchanger 102. For example, during descent of the aircraft, gas turbine engine 20 can reduce its speed, power, and temperature, causing rim 132 of rotor disk 130 to be cooled relatively quickly by cooler air flowing through core flow path C in high pressure compressor 52. Rim 132 of rotor disk 130 can be cooled to a temperature about 800° F. (444° C.) lower than that of web 134 and bore 136 of rotor disk 130. Bore cavity thermal conditioning system 100 can reduce that thermal gradient by cooling bore cavity 128, and thus cooling web 134 and bore 136, prior to descent. For example, bore cavity 128 can be cooled to within about 200° F. (111° C.) of the temperature of rim 132, cooled to within about 0° F. (0° C.) of the temperature of rim 132, or cooled to a temperature less than the temperature of rim 132. In one embodiment, bore cavity 128 can be cooled for about 10 minutes prior to descent and during at least a portion of descent. In an alternative embodiment, bore cavity 128 can be cooled for a greater or a shorter time period so long as the time period is sufficient to reduce thermal gradient between rim 132 and web 134 and bore 136. In some embodiments of gas turbine engine 20, one important period of time for reducing thermal gradient is about ten seconds into descent of gas turbine engine 20 and its associated aircraft.

Bore cavity thermal conditioning system 100 need not be used only for take-off and descent. Bore cavity thermal conditioning system 100 can also be used at other times and other power conditions when there is a transient increase or decrease in power (and thus temperature) of gas turbine engine 20. Any condition where there is a change in gas turbine engine power resulting in a change in gas path temperature can be conditioned to reduce resulting transient or steady state thermal gradient of a component, and thus reduce the thermal stresses on that component. In the illustrated embodiment, bore cavity thermal conditioning system 100 is used to condition substantially all bore cavities in gas turbine engine 20. In other embodiments, bore cavity thermal conditioning system 100 can be used to condition only those engine locations deemed appropriate for conditioning in a particular application. For example, bore cavity thermal conditioning system 100 can be used to condition one or more bore cavities in a compressor and/or a turbine, such as low pressure compressor 44, high pressure compressor 52, high pressure turbine 44, and/or low pressure turbine 46.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, the specific shape, locations, quantities, and configurations of the passages and valves of bore cavity thermal conditioning system 100 can be modified as appropriate for a particular gas turbine engine application. Additionally, heat exchanger 102 can be positioned external to gas turbine engine 10, such as, for example: in an engine bay, on an engine outer case, on an external pylon, or in an engine bay of a second gas turbine engine, yet still be part of bore cavity thermal conditioning system 100 and gas turbine engine 10. Moreover, heat exchanger 102 can provide thermal conditioning for a single gas turbine engine 10, or can provide thermal conditioning for multiple gas turbine engines. Further, temperature values described above are applicable to particular applications and embodiments of gas turbine engine 10, but can be varied as appropriate for different applications and embodiments of gas turbine engine 10.

Discussion of Possible Embodiments

The following are non-exclusive descriptions of possible embodiments of the present invention.

A gas turbine engine can include a rotor including at least one rotor bore cavity and a heat exchanger. The heat exchanger can be fluidically connected to a conditioning air source and to the rotor bore cavity for flowing air from the conditioning air source to the rotor bore cavity. The heat exchanger can also be fluidically connected to a hot fluid source and a cool fluid source for selectively heating and cooling conditioning air flowing to the rotor bore cavity.

The gas turbine engine of the preceding paragraph can optionally include, additionally and/or alternatively any, one or more of the following features, configurations and/or additional components:

a cool fluid passage can fluidically connect the cool fluid source to the heat exchanger; a hot fluid passage can fluidically connect the hot fluid source to the heat exchanger; and at least one valve can be fluidically positioned between the heat exchanger and each of the cool fluid passage and the hot fluid passage for selectively allowing and limiting flow through the heat exchanger;

an exhaust passage can fluidically connect the heat exchanger to a turbine for exhausting air from both the hot fluid source and the cool fluid source after flowing through the heat exchanger from each of the hot fluid source and the cool fluid source;

the conditioning air source can be a compressor and a conditioning air passage can fluidically connect the compressor to the heat exchanger;

the conditioning air source can be a diffuser positioned downstream of a compressor and a conditioning air passage can fluidically connect the diffuser to the heat exchanger;

the hot fluid source can be a turbine and a hot air passage can fluidically connect the turbine to the heat exchanger;

the cool fluid source can be a compressor and a cool air passage can fluidically connect the compressor to the heat exchanger the conditioning air source can be the compressor, a conditioning air passage can fluidically connect the compressor to the heat exchanger, and the cool air passage can be connected to the compressor upstream of the conditioning air passage;

the cool fluid source can be a fan bypass and a cool air passage can fluidically connect the fan bypass to the heat exchanger; and/or the heat exchanger can include a first passage fluidically connecting the conditioning air source to the rotor bore cavity and a second passage fluidically connected to each of the hot fluid source and the cool fluid source, and the second passage can be in heat exchange relationship with the first passage.

A gas turbine engine can include a rotor including at least one rotor bore cavity; and a bore cavity thermal conditioning system. The bore cavity thermal conditioning system can have a plurality of passages that can deliver heated conditioning air to the rotor bore cavity for a first engine operating condition that includes an increase in gas turbine engine power resulting in an increase in gas path temperature. The plurality of passages can also deliver cooled conditioning air to the rotor bore cavity for a second engine operating condition that includes a decrease in gas turbine engine power resulting in a decrease in gas path temperature.

The gas turbine engine of the preceding paragraph can optionally include, additionally and/or alternatively any, one or more of the following features, configurations and/or additional components:

the plurality of passages can include a hot air passage fluidically connected to a turbine of the gas turbine engine and a cool air passage fluidically connected to a cool air source selected from the group consisting of a compressor of the gas turbine engine and a fan bypass of the gas turbine engine.

A method can include supplying conditioning air to a rotor disk bore cavity of a gas turbine engine, heating the conditioning air for a first engine operating condition, and cooling the conditioning air for a second engine operating condition. The first engine operating condition can include an increase in gas turbine engine power resulting in an increase in gas path temperature. The second engine operating condition can include a decrease in gas turbine engine power resulting in a decrease in gas path temperature.

The method of the preceding paragraph can optionally include, additionally and/or alternatively any, one or more of the following features, configurations and/or additional steps:

conditioning air can be supplied to a rotor disk bore cavity of a gas turbine engine; the conditioning air can be heated for a first engine operating condition that includes an increase in gas turbine engine power resulting in an increase in gas path temperature, and the conditioning air can be cooled for a second engine operating condition that includes a decrease in gas turbine engine power resulting in a decrease in gas path temperature;

the first engine operating condition can be aircraft take-off and the second engine operating condition can be aircraft descent;

the conditioning air can be heated during ground idle prior to aircraft take-off and the conditioning air can be cooled prior to aircraft descent;

the conditioning air can be heated during aircraft take-off and the conditioning air can be cooled during aircraft descent;

the conditioning air can be heated and cooled via a heat exchanger;

air can flow from a turbine section through the heat exchanger to heat the conditioning air;

air can flow from a compressor through the heat exchanger to cool the conditioning air; and/or fan bypass air can flow through the heat exchanger to cool the conditioning air.

The invention claimed is:

1. A gas turbine engine comprising:
   a rotor comprising at least one rotor bore cavity; and
   a heat exchanger fluidically connected to a conditioning air source and to the rotor bore cavity for flowing air from the conditioning air source to the rotor bore cavity, wherein the heat exchanger is also fluidically connected to a hot fluid source and a cool fluid source for selectively heating and cooling conditioning air flowing to the rotor bore cavity.

2. The gas turbine engine of claim 1, and further comprising:
   a cool fluid passage fluidically connecting the cool fluid source to the heat exchanger;
   a hot fluid passage fluidically connecting the hot fluid source to the heat exchanger; and
   at least one valve fluidically positioned between the heat exchanger and each of the cool fluid passage and the hot fluid passage for selectively allowing and limiting flow through the heat exchanger.

3. The gas turbine engine of claim 2, and further comprising:
   an exhaust passage fluidically connecting the heat exchanger to a turbine for exhausting air from both the hot fluid source and the cool fluid source after flowing through the heat exchanger from each of the hot fluid source and the cool fluid source.

4. The gas turbine engine of claim 1, wherein the conditioning air source is a compressor and further comprising:
   a conditioning air passage fluidically connecting the compressor to the heat exchanger.

5. The gas turbine engine of claim 1, wherein the conditioning air source is a diffuser positioned downstream of a compressor and further comprising:
   a conditioning air passage fluidically connecting the diffuser to the heat exchanger.

6. The gas turbine engine of claim 1, wherein the hot fluid source is a turbine and further comprising:
   a hot air passage fluidically connecting the turbine to the heat exchanger.

7. The gas turbine engine of claim 1, wherein the cool fluid source is a compressor and further comprising:
   a cool air passage fluidically connecting the compressor to the heat exchanger.

8. The gas turbine engine of claim 7, wherein the conditioning air source is also the compressor and further comprising:
   a conditioning air passage fluidically connecting the compressor to the heat exchanger, wherein the cool air passage is connected to the compressor upstream of the conditioning air passage.

9. The gas turbine engine of claim 1, wherein the cool fluid source is a fan bypass and further comprising:
   a cool air passage fluidically connecting the fan bypass to the heat exchanger.

10. The gas turbine engine of claim 1, wherein the heat exchanger comprises a first passage fluidically connecting the conditioning air source to the rotor bore cavity and a second passage fluidically connected to each of the hot fluid source and the cool fluid source, wherein the second passage is in heat exchange relationship with the first passage.

11. A gas turbine engine comprising:
   a rotor comprising at least one rotor bore cavity; and
   a bore cavity thermal conditioning system having a plurality of passages that deliver heated conditioning air to the rotor bore cavity for a first engine operating condition that includes an increase in gas turbine engine power resulting in an increase in gas path temperature and deliver cooled conditioning air to the rotor bore cavity for a second engine operating condition that includes a decrease in gas turbine engine power resulting in a decrease in gas path temperature.

12. The gas turbine engine of claim 11, wherein the plurality of passages comprise:
   a hot air passage fluidically connected to a turbine of the gas turbine engine; and
   a cool air passage fluidically connected to a cool air source selected from the group consisting of a compressor of the gas turbine engine and a fan bypass of the gas turbine engine.

13. A method comprising:
   supplying conditioning air to a rotor disk bore cavity of a gas turbine engine;
   heating the conditioning air for a first engine operating condition that includes an increase in gas turbine engine power resulting in an increase in gas path temperature; and
   cooling the conditioning air for a second engine operating condition that includes a decrease in gas turbine engine power resulting in a decrease in gas path temperature.

14. The method of claim 13, wherein the first engine operating condition is aircraft take-off and the second engine operating condition is aircraft descent.

15. The method of claim 14, wherein the conditioning air is heated during ground idle prior to aircraft take-off and wherein the conditioning air is cooled prior to aircraft descent.

16. The method of claim 15, wherein the conditioning air is heated during aircraft take-off and wherein the conditioning air is cooled during aircraft descent.

17. The method of claim 13, wherein the conditioning air is heated and cooled via a heat exchanger.

18. The method of claim 17, and further comprising:
   flowing air from a turbine section through the heat exchanger to heat the conditioning air.

19. The method of claim 17, and further comprising:
   flowing air from a compressor through the heat exchanger to cool the conditioning air.

20. The method of claim 17, and further comprising:
   flowing fan bypass air through the heat exchanger to cool the conditioning air.

\* \* \* \* \*